United States Patent
Chou

(10) Patent No.: US 8,089,427 B2
(45) Date of Patent: Jan. 3, 2012

(54) DISPLAY CONTROL CIRCUIT FOR VACUUM FLUORESCENT DISPLAY

(75) Inventor: Yen-Ynn Chou, Taipei County (TW)

(73) Assignee: Princeton Technology Corporation, Taipei County (TW)

( * ) Notice: Subject to any disclaimer, the term of this patent is extended or adjusted under 35 U.S.C. 154(b) by 1132 days.

(21) Appl. No.: 11/902,743

(22) Filed: Sep. 25, 2007

(65) Prior Publication Data

US 2008/0224959 A1 Sep. 18, 2008

(30) Foreign Application Priority Data

Mar. 14, 2007 (TW) .............................. 96108720 A

(51) Int. Cl.
*G09G 3/22* (2006.01)
(52) U.S. Cl. ....... 345/75.1; 345/204; 345/690; 327/176; 327/201; 327/295; 327/296; 327/298
(58) Field of Classification Search ................. 345/75.1, 345/204, 690; 327/115–118, 175–176, 293–295
See application file for complete search history.

(56) References Cited

U.S. PATENT DOCUMENTS

| | | | | |
|---|---|---|---|---|
| 4,963,860 A * | 10/1990 | Stewart | ........................ | 345/206 |
| 6,759,886 B2 * | 7/2004 | Nakanishi | ..................... | 327/295 |
| 2004/0207574 A1 * | 10/2004 | Arai et al. | ..................... | 345/75.1 |
| 2005/0162368 A1 * | 7/2005 | Yoshida et al. | ................. | 345/98 |

* cited by examiner

*Primary Examiner* — Quan-Zhen Wang
*Assistant Examiner* — Jennifer Nguyen
(74) *Attorney, Agent, or Firm* — Muncy, Geissler, Olds & Lowe, PLLC

(57) ABSTRACT

The invention provides display control circuits for Vacuum Fluorescent Displays (VFDs). The display control circuit controls a plurality of display units of the VFD and comprises an image signal generator generating a plurality of image signals, a clock signal generator generating a clock signal, and a plurality of control signal generators. Each control signal generator receives one of the image signals and the clock signal, generates a control signal for one of the display unit, and determines the duty cycle of the control signal according to the received image signal and the clock signal. The brightness of one display unit varies with the duty cycles of the corresponding control signal. The clock signal generator comprises a plurality of flip-flops coupled in series and a plurality of logic gates.

7 Claims, 2 Drawing Sheets

DISPLAY CONTROL CIRCUIT FOR VACUUM FLUORESCENT DISPLAY

BACKGROUND OF THE INVENTION

1. Field of the Invention

The invention relates to display control circuits for Vacuum Fluorescent Display (VFD).

2. Description of the Related Art

The fast-growing high-tech industry has incorporated display monitors in more and more electronic devices; making life easier and more convenient for humans.

Liquid Crystal Displays (LCDs) are very common in high-tech devices, such as cellular phones, televisions, computer display monitors, and other devices. Compared with Cathode Ray Tubes (CRTs), LCDs have smaller sizes and are easier to be assembled in electronic devices. However, LCDs comprise backlight modules resulting in relatively diminished images when bright light surrounds the outside of the display, such as sunlight.

Compared with LCDs, Vacuum Fluorescent Displays (VFDs) provide high brightness. Meanwhile, since VFDs can provide clear images despite being surrounded by sunlight and the cost of VFDs is cheaper than LCDs, VFDs are a suitable display option for some electronic devices.

VFDs are generally utilized in audio devices, microwave ovens or clocks to display numerals, English letters, or simple patterns. The VFD comprises a screen. The screen can be divided into a plurality of display units. To control the brightness and image displayed in the display units, each display unit requires a clock signal and an image signal.

Because the display units of the conventional VFD each requires a exclusive clock signal to control the brightness, the conventional display control circuit of the VFD comprises a plurality of clock signal generators generating the clock signals for different display units. The clock signal generators occupy large circuit area and increase production costs. It is desirable to develop a smaller-sized and cheaper display control circuit to be utilized in VFDs.

BRIEF SUMMARY OF THE INVENTION

The invention provides display control circuits for Vacuum Fluorescent Displays (VFDs). The display control circuit controls a plurality of display units and comprises an image signal generator generating a plurality of image signals for the display units, a clock signal generator generating a clock signal, and a plurality of control signal generators corresponding to the display units and each generating a control signal according to the clock signal and the corresponding image signal to control the corresponding display unit. The clock signal generator comprises a plurality of flip-flops coupled in series and a plurality of logic gates. The duty cycle of each control signal is controlled by the corresponding control signal generator.

In some embodiments of the invention, clock signal generators are disclosed. The clock signal generator comprises a reference clock signal generator providing a reference clock signal, a plurality of flip-flips coupled in series, and a logic circuit comprising a plurality of OR gates. The first flip-flop is coupled to the reference clock signal generator to receive and process the reference clock signal. Based on the reference clock signal, each flip-flop generates a processed clock signal and transmits the processed clock signal to the next flip-flop. The OR gates are coupled to the flip-flops to receive the processed clock signals. The logic circuit outputs a clock signal.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
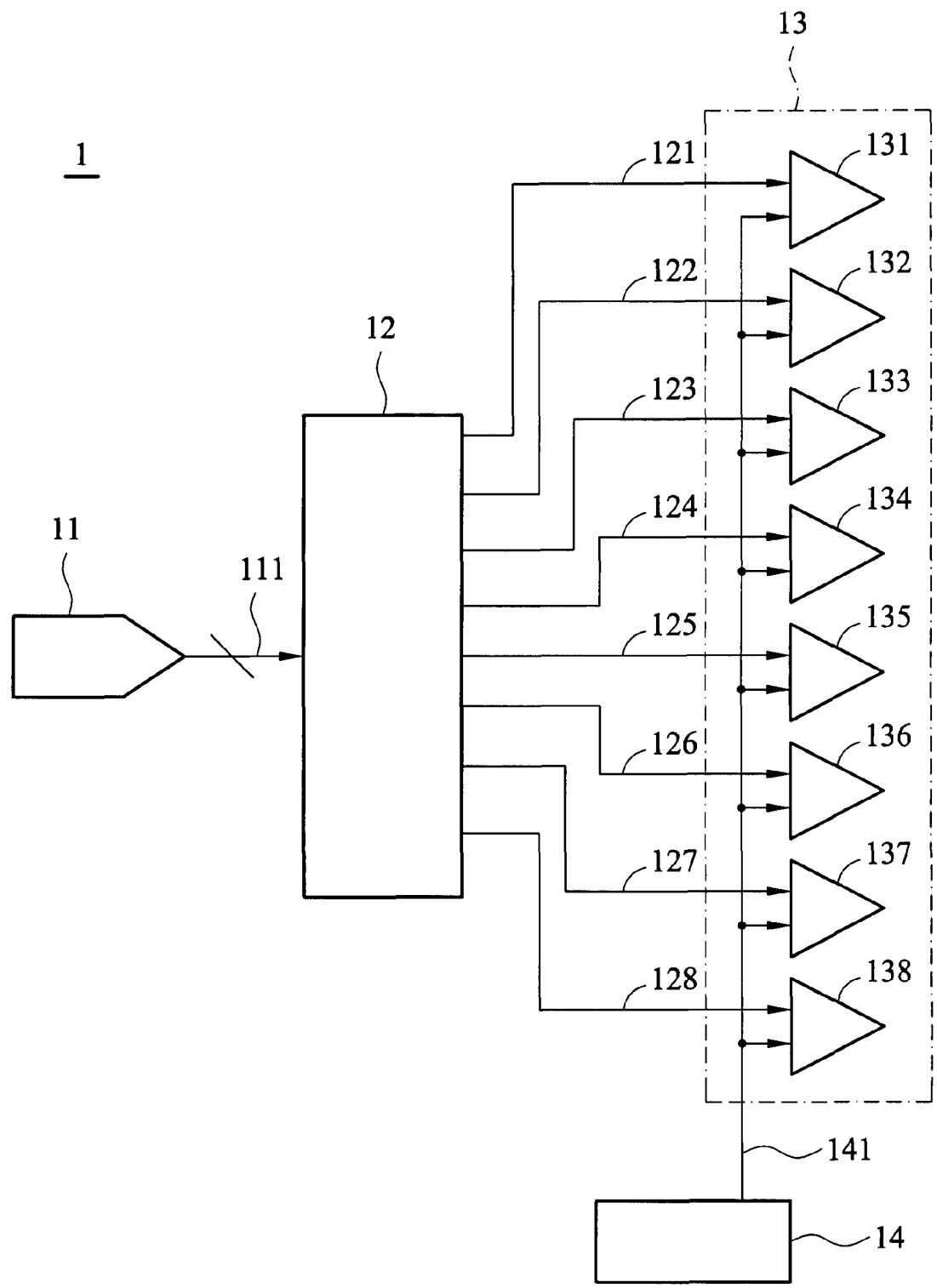
FIG. 1 shows an embodiment of the display control circuit of the invention.

FIG. 1 shows an embodiment of the display control circuit of the invention. The display control circuit 1 controls the display units (not shown in the figure) of a VFD, and comprises a data generator 11, an image signal generator 12, a set of control signal generators 13 and a clock generator 14. There are eight control signal generators 131~138 in the set of control signal generators 13 in this embodiment. Each control signal generator controls a display unit of the VFD.

As shown in FIG. 1, the data generator 11 is coupled to the image signal generator 12 to provide image data 111 for the image signal generator 12. The image signal generator 12 is coupled to the control signal generators 131~138. After processing the image data 111, the image signal generator 12 generates a plurality of image signals 121~128 for the control signal generators 131~138, respectively. As shown in FIG. 1, the image signal 121 is transmitted to the control signal generator 131, the image signal 122 is transmitted to the control signal generator 132, the image signal 123 is transmitted to the control signal generator 133, and so on.

The clock signal generator 14 is coupled to all control signal generators 131~138 and outputs a clock signal 141. The clock signal 141 comprises pulses spaced with specific time units.

Figure 2:
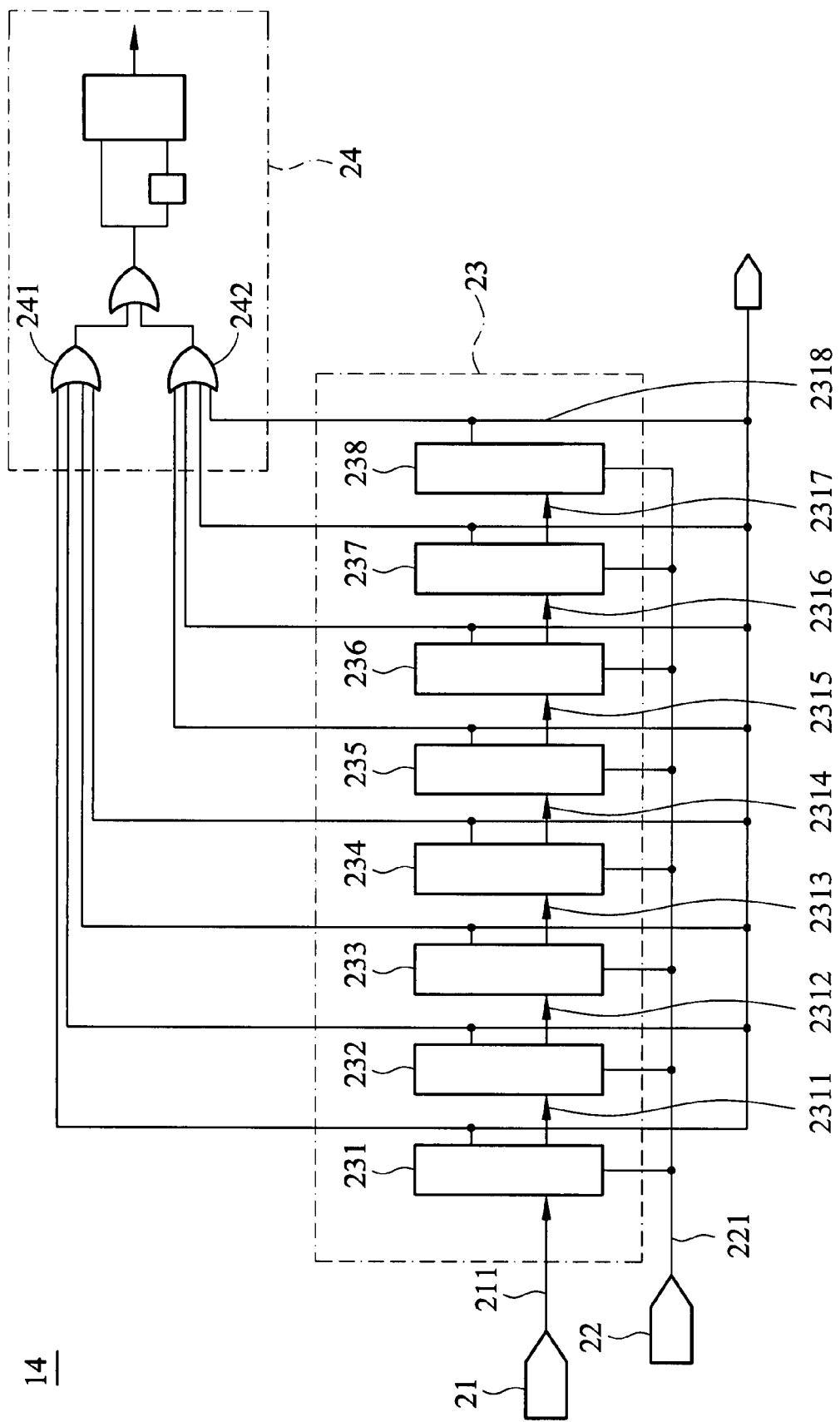
FIG. 2 shows an embodiment of the clock signal generator of the invention.

FIG. 2 shows an embodiment of the clock signal generator of the invention. The clock signal generator 14 comprises a reference clock signal generator 21, a reset signal generator 22, a set of flip-flops 23 and a logic circuit 24. In this example, the set of flip-flops 23 includes eight flip-flops 231~238 coupled in series. Each flip-flop comprises a clock signal input terminal, a first output terminal, a second output terminal, and a reset signal input terminal. The reference clock signal generator 21 is coupled to the clock signal input terminal of the first flip-flop 231 and provides a reference clock signal 211 for the first flip-flop 231. The first output terminal of the first flip-flop 231 is coupled to an OR gate 241 of the logic circuit 24. The second output terminal of the first flip-flop 231 is coupled to the clock signal input terminal of the second flip-flop 232. After processing the reference clock signal 211, the first flip-flop 231 generates a first clock signal 2311 and transmits the first clock signal 2311 to the OR gate 241 via the first output terminal and transmits the first clock signal 2311 to the clock signal input terminal of the second flip-flop 232 via the second output terminal. The first output terminal of the second flip flop 232 is coupled to the OR gate 241 of the logic circuit 24. The second output terminal of the second flip-flop 232 is coupled to the clock signal input terminal of the third flip-flop 233. After processing the first clock signal 2311, the second flip-flop 232 generates a second clock signal 2312 and transmits the second clock signal 2312 to the OR gate 241 via the first output terminal and transmits the second clock signal 2312 to the clock signal input terminal of the third flip-flop 233 via the second output terminal. The first output terminal of the third flip-flop 233 is coupled to the OR gate 241. The second output terminal of the third flip-flop 233 is coupled to the clock signal input terminal of the fourth flip-flop 234. After processing the second clock signal 2312, the third flip-flop 233 generate a third clock signal 2313 and transmits the third clock signal 2313 to the OR gate 241 via the first output terminal and transmits the third clock signal 2313 to the clock input terminal of the fourth flip-flop 234 via the second output terminal. The first output terminal of the fourth flip-flop 234 is coupled to the OR gate 241. The second output terminal of the fourth flip-flop 234 is coupled to the clock signal input terminal of the fifth flip-flop 235. After processing the third clock signal 2313, the fourth flip-flop 234 generates a fourth clock signal 2314 and transmits the fourth clock signal 2314 to the OR gate 241 via the first output terminal and transmits the fourth clock signal 2314 to the clock signal input terminal of the fifth flip-flop 235 via the second output terminal. The first output terminal of the fifth flip-flop 235 is coupled to an OR gate 242 of the logic circuit 24. The second output terminal of the fifth flip-flop 245 is coupled to the clock signal input terminal of the sixth flip-flop 236. After processing the fourth clock signal 2314, the fifth flip-flop 235 generates a fifth clock signal 2315 and transmits the fifth clock signal 2315 to the OR gate 242 via the first output terminal and transmits the fifth clock signal 2315 to the clock signal input terminal of the sixth flip-flop 236 via the second output terminal. The first output terminal of the sixth flip-flop 236 is coupled to the OR gate 242. The second output terminal of the sixth flip-flop 236 is coupled to the clock signal input terminal of the seventh flip-flop 237. After processing the fifth clock signal 2315, the sixth flip-flop 236 generates a sixth clock signal 2316 and transmits the sixth clock signal 2316 to the OR gate 242 via the first output terminal and transmits the sixth clock signal 2316 to the clock signal input terminal of the seventh flip-flop 237 via the second output terminal. The first output terminal of the seventh flip-flop 237 is coupled to the OR gate 242. The second output terminal of the seventh flip-flop 237 is coupled to the clock signal input terminal of the eighth flip-flop 238. After processing the sixth clock signal 2316, the seventh flip-flop 237 generates a seventh clock signal 2317 and transmits the seventh clock signal 2317 to the OR gate 242 via the first output terminal and transmits the seventh clock signal 2317 to the clock signal input terminal of the eighth flip-flop 238 via the second output terminal. The first output terminal of the eighth flip-flop 238 is coupled to the OR gate 242. After processing the seventh clock signal 2317, the eighth flip-flop 238 generates an eighth clock signal 2318 and transmits the eighth clock signal 2318 to the OR gate 242. The reset signal generator 22 provides a reset signal 221 for the flip-flops 231~238 to reset the flip-flops 231~238.

In the embodiment shown in FIG. 2, the clock signal generator 14 comprises eight flip-flops 231~238. The flip-flops 231~238 repeat the same process on the reference clock signal 211 eight times. The logic circuit 24 generates a clock signal 141 having one pulse every 256 ($2^8$) time units. Referring to FIG. 1, the clock signal 141 is coupled to the control signal generators 131~138.

Referring to FIG. 1, after receiving the clock signal 141 outputted from the clock signal generator 14, the control signal generators 131~138 process the clock signal 141 individually. The control signal generators 131~138 comprise distinct logic modules so that the control signals generated by the control signal generators 131~138 have distinct duty cycles. The duty cycle of the control signal determines the time spacing of turning on the corresponding display unit.

Instead of the clock signal generators required in the conventional display control circuit, the display control circuit disclosed by the invention only requires one clock signal generator. The circuit size and cost of the display control circuit are reduced by the invention.

While the invention has been described by way of example and in terms of embodiments, it is to be understood that the invention is not limited thereto. To the contrary, it is intended to cover various modifications and similar arrangements (as would be apparent to those skilled in the Art). Therefore, the scope of the appended claims should be accorded to the broadest interpretation so as to encompass all such modifications and similar arrangements.

What is claimed is:

1. A display control circuit for controlling a plurality of display units of a Vacuum Fluorescent Display and comprising:
    an image signal generator, generating a plurality of image signals;
    a clock signal generator, comprising:
        a reference clock signal generator, providing a reference clock signal;
        a reset signal generator, providing a reset signal;
        a plurality of flip-flops coupled in series; and
        a plurality of logic gates,
        wherein:
            each of the flip-flops comprises a reset signal input terminal receiving the reset signal, a clock signal input terminal, a first output terminal and a second output terminal;
            a first one of the flip-flops is coupled to the reference clock signal generator to receive the reference clock signal via the clock signal input terminal thereof, and outputs a first clock signal at the first output terminal and the second output terminal thereof, and the second output terminal of the first one of the flip-flops outputs the first clock signal to the clock signal input terminal of a second one of the flip-flops;
            the rest of the flip-flops are serially coupled to the second one of the flip-flops by the same structure coupling the first one and the second one of the flip-flops; and
            the first output terminals of all flip-flops are coupled to the logic gates to generate a clock signal; and
    a plurality of control signal generators, coupled to the image signal generator to receive the image signals, respectively, and all coupled to the clock signal generator to receive the clock signal, wherein each of the control signal generators generate a control signal according to the received image signal and clock signal, and the control signals generated by the control signal generators to control the plurality of display units are of different duty cycles.

2. The display control circuit as claimed in claim 1, wherein each logic gate is implemented by an OR gate.

3. The display control circuit as claimed in claim 1, wherein the control signal generators each comprises a logic module determining the duty cycle of the generated control signal.

4. The display control circuit as claimed in claim 3, wherein the duty cycle of the control signal determines the brightness of the corresponding display unit.

5. A clock signal generator, comprising:
a reference clock signal generator, providing a reference clock signal;
a plurality of flip-flops coupled in series, wherein a first one of the flip-flops is coupled to the reference clock signal generator to receive the reference clock signal and, based on the reference clock signal, each flip-flop generates a processed clock signal; and
a logic circuit, comprising a plurality of OR gates coupling to the flip-flops to receive the processed clock signals and generate a clock signal according to the processed clock signals,
wherein:
  each of the flip-flops comprises a clock signal input terminal, a first output terminal, a second output terminal, and a reset signal input terminal;
  the first one of the flip-flops receives the reference clock signal via the clock input terminal thereof and outputs a first clock signal at the first and second output terminals thereof, and the first output terminal of the first one of the flip-flops outputs the first clock signal to the logic circuit as the processed clock signal corresponding thereto, and the second output terminal of the first one of the flip-flops outputs the first clock signal to the clock signal input terminal of a second one of the flip-flops; and
  the rest of the flip-flops are serially coupled to the second one of the flip-flops by the same structure coupling the first one and the second one of the flip-flops; and
  the first output terminals of all flip-flops are coupled to the logic circuit to generate the clock signal.

6. The clock signal generator as claimed in claim 5, wherein the amount of the flip-flips determines the amount of time units spacing two pulses of the clock signal.

7. The clock signal generator as claimed in claim 5, further comprising a reset signal generator generating a reset signal to be coupled to the reset signal input terminals of all of the flip-flops.

* * * * *